Feb. 9, 1932. F. M. PATTERSON 1,843,930
BLOW-OFF VALVE
Filed July 16, 1927 2 Sheets-Sheet 1

INVENTOR
Franklin M. Patterson
BY
Cornelius D. Ehret
ATTORNEY

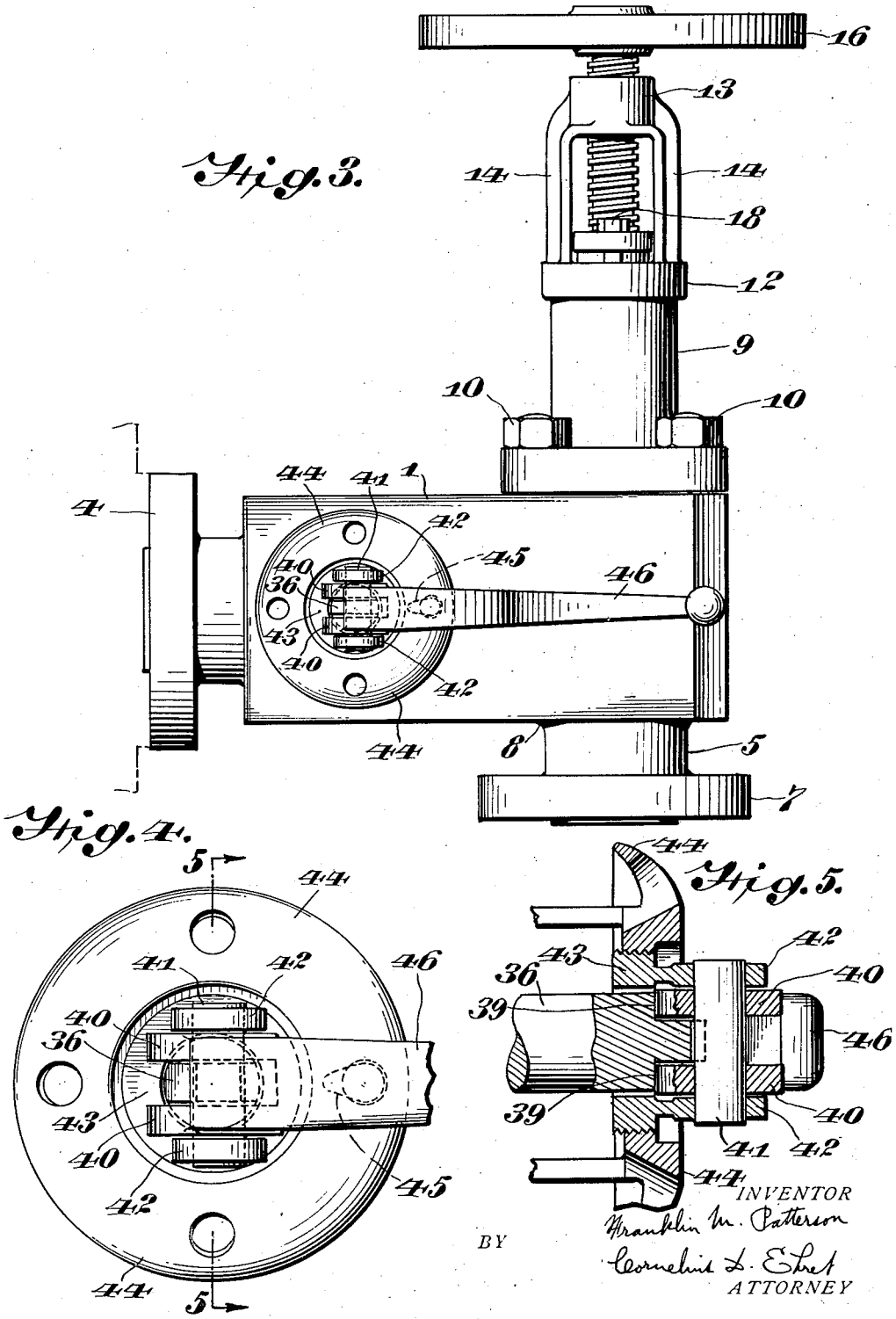

Patented Feb. 9, 1932

1,843,930

UNITED STATES PATENT OFFICE

FRANKLIN M. PATTERSON, OF PITMAN, NEW JERSEY, ASSIGNOR TO COCHRANE CORPORATION, OF PHILADELPHIA, PENNSYLVANIA, A CORPORATION OF PENNSYLVANIA

BLOW-OFF VALVE

Application filed July 16, 1927. Serial No. 206,259.

My invention relates to valves for controlling the flow of fluids and especially to valves for controlling the flow of fluids under high pressures.

My invention resides in a valve having operating mechanism with which there is associated other mechanism to prevent operation of the valve when it is subject to an unbalanced pressure condition.

My invention further resides in a valve having operating mechanism which in an initial or preliminary movement effects a balanced condition of the valve and which may thereafter be actuated to operate the valve.

My invention further resides in a valve mechanism adapted for blow-off discharge service of power boilers operating under high pressures, more particularly pressures up to and above 400 pounds.

Still further, my invention resides in a valve apparatus through which there is no flow unless the valve opening is sufficiently large to prevent wire-drawing and particularly in a valve apparatus including a master valve and a check valve in which the check valve prevents the flow of a controlled fluid while said master valve is opening, until the space between the face and seat of the master valve is great enough to obviate the possibility of wire-drawing.

My invention also resides in features of novelty hereinafter described and claimed.

For an illustration of an embodiment of my invention reference is made to the accompanying drawings, in which:

Fig. 3 is an elevational view.

Fig. 4 is a fragmentary view on an enlarged scale of parts shown in Figs. 1, 2 and 3.

Fig. 5 is a sectional view taken on line 5—5 of Fig. 4.

Figures 1, 2:
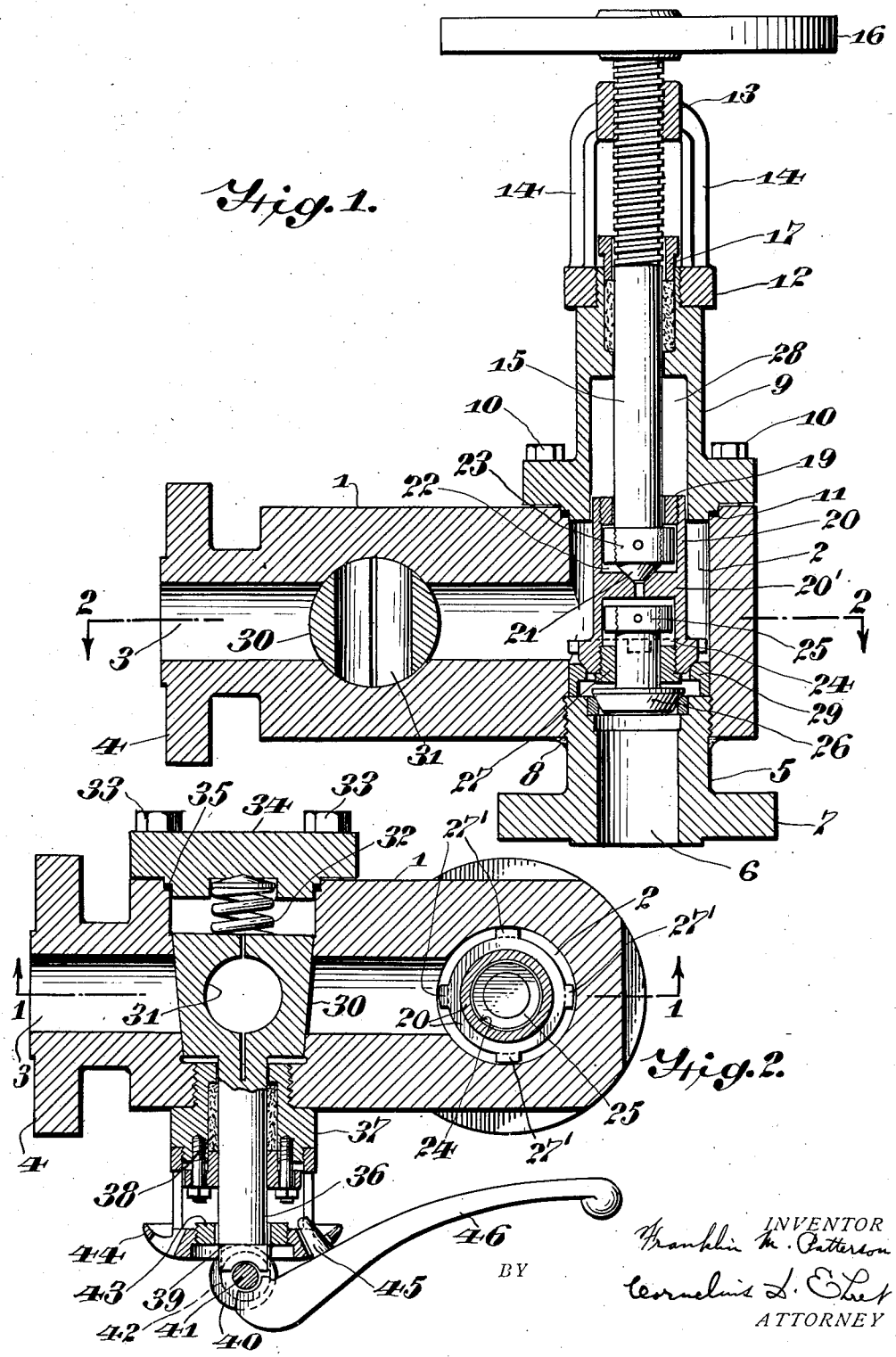
Fig. 1 is an elevational view in section taken on line 1—1 of Fig. 2.
Fig. 2 is a sectional view taken on line 2—2 of Fig. 1.

Referring to the drawings, and particularly to Fig. 1, the valve body or manifold 1 is provided with a passage 2 extending transversely thereof and a second, horizontal passage 3 having one end in communication with passage 2 and its other end in conducting relation to the interior of a boiler drum or other source of fluid flow, not shown, to which the valve body is suitably fastened, such as by bolts which extend through the flange 4 integral with the valve body 1. A member 5 having a passage 6 therethrough is threadably received by one end of the transverse passage 2 and is clamped by bolts passing through the flange 7, or in any other satisfactory manner, to an outlet conductor, not shown. The member 5 is welded as indicated at 8 to the valve manifold and becomes practically an integral part of it.

In axial alignment with the member 5 and at the opposite end of the transverse passage 2, is a guide member 9 held to the manifold by bolts 10. A packing 11 prevents leakage from the passage 2 to the exterior of the valve. The guide member has a reduced extension at its upper end on which is screwed the base member 12 of a stationary nut 13 spaced therefrom and supported by the legs 14. Preferably the members 12, 13 and 14 are a single piece or casting.

A valve operating rod or stem 15 passes through the guide member 9 and threadably engages the nut 13. As the hand wheel 16, which is attached to the rod, is rotated there is a vertical movement of the rod which is utilized as hereinafter described. The packing gland 17, which prevents leakage around the rod 15 as it passes through the guide member 9, may be adjusted by the bolt 18.

The lower end of the valve stem passes freely through a threaded plug or nut 19 screwed into the upper end of the master valve 20, and terminates in a tapered face 21 which cooperates with a ground seat in a transverse wall 20' of the master valve. The space between the valve seat and the plug 19 is, in effect, a cylinder 22 in which the combined stop and piston member 23, fastened to the stem 15, as in the manner shown in Fig. 1, is loosely fitted.

The valve formed by the end of the rod 15 and hereinafter referred to as the pilot valve controls a port connecting the chamber 22 to a lower chamber 24 also within the body of the master valve in which is loosely fitted the piston member 25 attached to the stem of a check valve 26 which passes through a plug 27 threaded into the lower end of the chamber 24.

The check valve, preferably of a hardened steel, seats in a replaceable insert of suitable hardened material, as hardened tool steel, mounted in the flanged member 5 while the master valve which is guided at its lower end by the fins 27' in the passage 2 and at its upper end by the side walls of a chamber 28 in the guide member 9, seats in the member 29. The valve seat is formed on the block 29 which is pressed into the chamber 2 and may be re-ground by removing the guide member 9 and the mechanism appurtenant thereto and comprising in part the master valve and its operating mechanism, and inserting a refacing or other suitable tool through the open chamber 2. However, as this seat is not subjected to severe use as later described, such regrinding is necessary only after long use. The valves 26 and 20 control the transfer of fluid from the passage 2 to the passage 6 in a manner hereinafter described.

The flow through the valve body is also controlled by a tapered plug-valve 30 which may be rotated so as to bring the hole 31 extending therethrough into alignment with the passage 3 or so as to completely obstruct it. The valve which is fitted while cold may be made of a metal having a lower coefficient of expansion than the valve body 1 to prevent sticking of the valve when it is subjected to high temperatures. The spring 32 biases the valve against its seat and prevents leakage which might otherwise result because of the unequal expansion. This effect may also, to a degree, be compensated for by a saw slot through the valve body as shown, which creates a tension forcing the valves of the plug from one another and against the valve seat.

Bolts 33 clamp the plate 34 which receives the thrust of the spring 32, and the packing 35 to the valve body 1. This plate may be removed when it is desired to inspect, replace, or renew the valve 30. A valve stem 36, preferably part of the valve body itself, extends through a guiding plug 37 screwed into the valve body and provided with a packing means indicated generally by reference numeral 38. The stem, at its outer end, is so formed as to provide two shoulders 39 which cooperate with the faces of the cam members 40 mounted on and eccentric to the shaft 41 supported by the spaced lugs 42, which constitute an integral part of the threaded plug member 43.

The bell shaped top of the cage member 44, which is threaded on a reduced extension of the plug 37 and locked in position, as by a pin, is provided with four holes spaced 90° apart adapted to receive a pin member 45 attached to, or an integral part of, the valve operating lever 46, and threadably receives the supporting plug 43. The threads on the last named member are rather fine to permit a nice adjustment between the shoulders 39 and the cam faces.

Before the valve can be rotated from the fully open to the fully closed position, or vice versa, the lever 46 must first be rotated in a clockwise direction as viewed in Fig. 2 about its pivot 41 to remove the pin 45 from a hole in the top of the cage member. As the lever is rotated, the cam members 40, which are fastened to, or a part of, the lever 46, engage the shoulders of the valve stem and move the plug valve linearly from its seat. The lever 46 is then rotated in a plane at right angles to its prior movement, namely, about the axis of rotation of the plug valve to open or close the same, as desired. The valve seat may wear to such an extent that the shoulders 39 and cams 40 either tend to hold the valve from its seat or prevent the arm 46 from staying in its completely depressed position. This may be corrected by lifting the handle from the locked position, and rotating it, thereby unscrewing the plug 43 more or less from the cage member which moves the pivot 41, mounted thereon, away from the valve manifold.

When the valve mechanism described is to be used in high pressure service, the valve manifold encasing the two valve mechanisms is a unit block of forged steel to obtain maximum strength. By placing the axes of the valve mechanism at 90° as shown, it is possible to effect nearly a 25% reduction in weight without affecting the strength of the block and in addition this compact structure facilitates operation, replacement and repair of the individual valves.

Assuming the parts to be in the position shown in the drawings, and that it is desired to effect a transfer from a boiler, for example, to which the valve is fastened by the flange 4, to a discharge pipe connected to the valve by the flange 7, the lever 46 is moved outwardly from the valve body, lifting the plug valve 30 off of its seat in the manner described and permitting pressure to be applied on all sides of the valve so that it is balanced, the only resistance to rotation being that of the stuffing box. This balancing is effected without any appreciable flow past the valve, as valves 20 and 21 are closed at this time and the space between the latter and valve 30 is completely filled with water. The handle 46 may then easily be turned through an angle of 90°; rotating therewith, as described, the plug valve while it is in the balanced condition, until the pin 45, which was lifted out of one hole by the preliminary movement of the handle, is in register with the next hole, whereupon the handle is released and the spring 32 again forces the plug valve on its seat so that the seating surfaces in both plug and body are protected from the blast of the blow-off discharge. It is impossible to rotate the valve in any other than a balanced condition as the lever 46 cannot be manipulated to rotate the valve 30 unless the pin 45 has been first lifted out of one of the holes in the cap. Further, as the plug cannot be rotated while in intimate contact with its seating surface, all circumferential cutting or channeling, which would cause leakage, is prevented.

The opening of the valve 30 permits a relatively small amount of the fluid to pass around the upper end of the master valve 20 into the chamber 28 and thence around the loosely fitted rod 15 into the chamber 22. As the pressure on the master valve at this time is unbalanced, it is firmly forced on its seat 29. The hand-wheel is rotated to effect an upward movement of the valve 21, which, upon opening, permits the pressure in the chamber 22 to enter the chamber 24, forcing the check valve 26 on its seat and at the same time balancing the pressure on the master valve so that it may be moved with greater ease. As the wheel 16 is rotated further the stop member 23 engages the lower surface of the plug 19 and lifts the master valve while in the balanced condition from its seat. After the distance between the face of this valve and its seat has become so great that a subsequent flow at this point will not produce the destructive effect known as "wire-drawing", the cutting or abrasive action of a fluid passing at high velocity through a narrow orifice, the continued upward movement of the rod 15 brings the upper surface of plug 27 in the master valve in engagement with the piston member 25 on the check valve 26 and lifts it from its seat, permitting the fluid to flow from the boiler through the passages 3, 2 and 6, to the discharge or outlet pipe. As the diameter of the insert, forming a seat for the check valve, is less than that of the opening in the seat for the master valve, the check valve seat may be replaced by removing the outboard valve assembly comprising the guide member 9, the master valve 20, check valve 26, pilot valve 21, and the operating mechanism therefor. The insert, being somewhat freely mounted in the flanged member 5, may be readily removed with a suitable tool. Due to its composition and to the operation of the entire valve mechanism, the possibility of the necessity of such a replacement is remote.

To stop the flow, the operation is reversed. The hand-wheel 16 is rotated in a reverse direction to effect a downward movement of the valve rod. The check valve seats first and blocks further flow. As the wheel is rotated further, the master and pilot valves close in succession. The plug valve 30 is then lifted from its seat and returned to its original position.

While I have described my invention as controlling the passage of fluid from a boiler, it will be understood that it may be utilized to control the flow of fluid from other sources and otherwise produced, and is especially adapted for installations in which high pressures are employed.

As described, the valve body or manifold is a departure from usual practice and consists of a forged block whose outer contour is not in conformity with the shape, size, or location of passages through the block and the walls are therefore of non-uniform thickness. Under varying conditions, as of temperature, the unequal expansion and contraction of walls of such character would bind or clamp the movable valve member, which binding or clamping is prevented in my construction by slotting the valve member as disclosed and described above.

Having thus described my invention, what I claim as new and desire to secure by Letters Patent is:

1. Valve apparatus comprising a block member having a bore longitudinally thereof, valve members seated in said block within bores whose axes are at right angles to each other and in communication with said first-named bore, one of said valve members comprising a plug, operating means for unseating said plug before flow-controlling movement thereof, said operating means comprising a lever pivotally mounted upon a member adjustable with respect to said block, and a cam on said lever for engaging the stem of said plug to transmit both longitudinal and rotative movement thereto.

2. Valve apparatus comprising a block member having a bore longitudinally thereof, valve members seated in said block within bores whose axes are at right angles to each other and in communication with said first-named bore, one of said valve members comprising a plug, operating means for unseating said plug and effecting, in sequence, flow-controlling movement thereof, said operating means comprising a lever, a cam mounted thereon for freely engaging the stem of said plug, and a pivotal support for said cam adjustably mounted with respect to said plug, whereby movement of said support varies the distance between the actuating face of said cam and the plug stem.

3. In valve construction, a casing, a plug valve seated in said casing and rotatable to different control positions and bodily movable out of close seating relation with respect to its seat, complementary parts having screw-threaded engagement with each other providing for adjustment of one of said parts in the direction of such bodily movement of said valve, and valve-operating means connected to said one of said parts and adjustable therewith.

4. Valve apparatus comprising a valve member, a check valve loosely mounted in and carried by said valve member, and means for opening said valve member comprising a pilot valve for balancing said valve member and forcing said check valve closed until said valve member is opened to substantial extent.

5. Valve apparatus comprising a hollow valve member having a chamber in communication with the outlet side of said valve member, a check valve loosely supported by said member and having a plunger disposed in said chamber thereof, and an operating rod for lifting said valve member having pilot valve structure for opening a path from the inlet side of said valve member to said chamber for balancing said valve member and exerting pressure on said plunger for forcibly holding said check valve closed.

6. Valve apparatus comprising a hollow valve member having a chamber in communication with the outlet side of said valve member, a check valve loosely supported by said member and having a plunger disposed in said chamber thereof, an operating rod for lifting said valve member, said valve member, said rod, and said check valve having lost motion connection so that in opening the valve, the rod first moves alone, then with said valve member, and then with said check valve, and a pilot valve operated during initial movement of the rod for opening a path from the inlet side of said valve member to said chamber to balance said valve member during the remainder of its movement and for holding said check valve forcibly closed until moved by said rod.

7. Valve apparatus comprising a hollow valve member having a chamber in communication with the outlet side of said valve member, an operating member having a pilot valve for opening a path from the inlet side of said valve member to said chamber upon initial valve opening movement of said operating member and having structure for lifting said valve upon further movement, and a check valve having a plunger in said chamber and lifted by said operating member upon still further opening movement thereof.

FRANKLIN M. PATTERSON.